(12) United States Patent
Riedel (10) Patent No.: US 11,582,914 B2
(45) Date of Patent: Feb. 21, 2023

(54) AGRICULTURAL IMPLEMENT HAVING ARMS MOVABLE TO HEADLAND POSITIONS

(71) Applicant: AGCO International GmbH, Neuhausen (CH)

(72) Inventor: Felix Riedel, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 137 days.

(21) Appl. No.: 16/844,777

(22) Filed: Apr. 9, 2020

(65) Prior Publication Data

US 2020/0323142 A1 Oct. 15, 2020

(30) Foreign Application Priority Data

Apr. 12, 2019 (GB) ...................................... 1905205

(51) Int. Cl.
*A01D 78/10* (2006.01)
*A01D 78/00* (2006.01)

(52) U.S. Cl.
CPC ....... *A01D 78/1014* (2013.01); *A01D 78/007* (2013.01); *A01D 78/1085* (2013.01)

(58) Field of Classification Search
CPC .. A01D 78/007; A01D 78/10; A01D 78/1085; A01D 78/1014; A01D 78/1021; A01D 78/1028; A01D 78/144; A01B 63/24; A01B 63/008

See application file for complete search history.

(56) References Cited

U.S. PATENT DOCUMENTS

| 5,921,325 A | 7/1999 | Meek | |
|---|---|---|---|
| 2003/0041584 A1* | 3/2003 | Breneur | A01D 78/1014 56/379 |
| 2005/0126154 A1* | 6/2005 | Tonutti | A01D 78/144 56/377 |
| 2010/0032924 A1* | 2/2010 | Menichetti | A01D 78/144 280/638 |
| 2013/0014480 A1* | 1/2013 | Arnold | A01B 69/004 56/10.2 A |

(Continued)

FOREIGN PATENT DOCUMENTS

| DE | 102014018133 A1 | 6/2016 |
|---|---|---|
| EP | 0 950 347 A1 | 10/1999 |

(Continued)

OTHER PUBLICATIONS

European Patent Office, Search Report for related EP Application No. EP 20 16 5686, dated Sep. 18, 2020.

(Continued)

*Primary Examiner* — Alicia Torres (57) ABSTRACT

An agricultural implement having an elongated main chassis member, ground engaging wheels for supporting the main chassis member on the ground and at least one set of two arms, each arm being provided with at least one working implement and each arm being pivotably connected to the main chassis member and adapted to be moved between a working position, a headland position and a transport position. In the headland position, an inner working implement of the at least one set of arms is displaced laterally away from the main chassis member.

16 Claims, 6 Drawing Sheets

(56) References Cited

U.S. PATENT DOCUMENTS

| | | | |
|---|---|---|---|
| 2013/0118141 A1* | 5/2013 | Arnold | A01D 78/105 |
| | | | 56/367 |
| 2014/0373496 A1 | 12/2014 | Schott et al. | |
| 2016/0135369 A1* | 5/2016 | Arnold | A01D 78/1028 |
| | | | 56/370 |
| 2016/0309654 A1* | 10/2016 | Riedel | A01D 78/1014 |
| 2017/0118918 A1* | 5/2017 | Chaney | A01F 15/07 |
| 2017/0359959 A1* | 12/2017 | Wagner | A01D 78/1085 |
| 2019/0116717 A1* | 4/2019 | Pauli | A01B 63/02 |
| 2019/0380254 A1* | 12/2019 | Viaene | A01D 78/1028 |

FOREIGN PATENT DOCUMENTS

| | | | | |
|---|---|---|---|---|
| EP | 2253186 A1 | * | 11/2010 | ............. A01B 73/04 |
| EP | 3095316 A1 | | 11/2016 | |
| EP | 3 251 484 A1 | | 12/2017 | |
| WO | 2011/112078 A1 | | 9/2011 | |

OTHER PUBLICATIONS

UK Intellectual Property Office, Search Report for UK Priority Application No. GB1905205.9, dated Oct. 2, 2019.

* cited by examiner

AGRICULTURAL IMPLEMENT HAVING ARMS MOVABLE TO HEADLAND POSITIONS

FIELD OF THE INVENTION

The invention relates to agricultural hay tools having two or more operating implements. More specifically, the invention relates to agricultural rakes having two or more rotors each supporting a plurality of tines, and to a method for operation of the same.

BACKGROUND

Agricultural rakes generally comprise a main chassis member, ground engaging wheels for supporting the main chassis member on a ground surface, and a number of rotors, each of which is driven in rotation about a vertical rotor axis. In use, the main chassis member is conveniently attached to the rear of a towing vehicle, such as an agricultural tractor, by means of a drawbar and towing hitch. Power is transferred from a power take-off (PTO) stub on the tractor to the rotors by a drive train. The main chassis member comprises an elongated member which extends longitudinally and centrally behind the vehicle to which it is attached. The main chassis member supports two or more sets of arms, each set comprising an arm to each side of the main chassis member, each arm carrying at least one rotor. The arms are typically moveable between a substantially vertical transport position (for e.g. road transportation) and a substantially horizontal working position.

Each rotor comprises a hub and a plurality of tine arms extending radially from the hub. Crop engaging tines are attached to the radially outermost ends of the arms for raking or windrowing cut forage material lying on the ground. To engage and release the crop material, the tines are respectively lowered and raised at predetermined positions around a rotary circumferential path. To effect this lowering and raising the innermost end of each tine arm is slideably engaged in a cam track. As the rotor rotates, rollers on the arms move along a circular cam track which serves to twist the tine arms on their respective axes, thus raising and lowering the tines. Such an arrangement is present on rakes marketed by the applicant today under the brand "Fella", including model TS14055.

A working height of a rotor above the ground surface may be maintained by a rotor running gear comprised of one or more support wheels mounted below the hub. In the working position, the support wheels are adapted to protrude below the lowest position of tine to prevent the tines from striking the ground, which could otherwise result in damage to the tines and/or soil contamination of the crop material. The optimum working height may vary depending on factors such as the type of crop material and underlying terrain, and it is known to provide a height adjustment mechanism to extend or retract the support wheels relative to the hub. Such a mechanism may comprise a simple manually operated mechanical lever, or a more complex electrical or hydraulic actuator arrangement that may be adjusted from the towing vehicle.

In the case of an agricultural implement, such as a rake, the agricultural implement is towed in a first direction along a field to produce a swathe or windrow of crop material. The towing vehicle makes a headland turn and then tows the agricultural implement is a second direction, typically parallel and opposite to the first. When making the headland turn the arms are typically raised to an intermediate headland position between the transport position and the working position. However, when the rake enters a previously processed area with the arms in the headland position, for example when making a headland turn at the end of a field, the tines at the lowermost end of each arm may still disturb the windrow. To avoid this, the user is required to raise further the arms toward their road transportation orientation to obtain an improved headland position such that the lowermost tines are in practice lifted sufficiently clear of the ground surface. This is generally not a quick operation, leading to delays as the arms are raised and then prior to the next operational pass lowered again, and accordingly there is a need to minimise the extent to which the arms are raised and lowered to avoid windrowed crop material during such headland manoeuvres in order to minimise the time taken when the agricultural implement is out of the working position.

SUMMARY OF THE INVENTION

According to a first aspect of the present invention there is provided an agricultural implement comprising an elongated main chassis member, ground engaging wheels for supporting the main chassis member on the ground and at least one set of two arms, each arm being provided with at least one working implement and each arm being pivotably connected to the main chassis member and adapted to be moved between a working position, a headland position and a transport position, characterised in that in the headland position an inner working implement of the at least one set of arms is displaced laterally away from the main chassis member.

This has as an advantage that in the headland position, additional clearance between the tines at the lowermost end of each arm and the ground surface is provided.

Preferably each working implement comprises a rotor. More preferably, each of said rotors comprises a hub provided with tines.

Preferably, the towed agricultural implement further comprises a control system configured to detect when the headland position is required, in response, to displace the at least one working implement on each arm laterally away from the main chassis member and to raise the arms to the headland position.

In the case of a rake, by moving the or each of the rotors outwardly as the arm is pivoted upwards, a desired ground clearance (between the working implement and the ground surface) is achieved quicker than by pivoting the arms alone. Additionally, a reduced extent of lift of each arm is required to clear a typical accumulated windrow height, meaning that a return to the working position at the end of the headland manoeuvre may be accomplished quicker than previously.

Preferably, the control system is further configured to detect when the headland position is no longer required and, in response, return the arms to the working position. This return to the previously set working implement position simplifies operations for the user.

Preferably, for ease of set-up, the control system may be further configured, on detection of the commencement of the said headland manoeuvre, to move each rotor to a predetermined lateral position away from the main chassis member. Optionally, this predetermined position may be adaptable under the direction of a user.

Preferably the agricultural implement further comprises a position determination system (such as a satellite location system) coupled with the control system, by means of which the control system identifies the commencement of the headline manoeuvre. This allows automation of the arm-raising process for e.g. headlands and again simplifies operation for the user.

Preferably, the agricultural implement (or a towing vehicle to which the agricultural implement is attached, and with which the agricultural implement is in communication) further comprises one or more sensors coupled with the control system and operable therewith to determine a swathe height of material deposited by the agricultural implement, and the control system is further configured to adjust the extent of movement of the rotor along the arm away from the main chassis member during the said headland manoeuvre based on the windrow height, thereby providing clearance of the rotor above the windrow height. This automation of the setting of the extent of the lateral offset ensures that the arms are raised no further than required by ambient conditions (i.e. windrow height) to minimise the time required to revert to the working position and so minimises the time required to revert to the working position, while avoiding damage to the windrow.

Typically, the agricultural implement will operate in combination with a towing vehicle such as an agricultural tractor towing the agricultural implement. Preferably the control system (which may physically be mounted on the agricultural implement, on the towing vehicle, or distributed between the two) receives an indication of the commencement of the said headland manoeuvre from the towing vehicle. A preferred means for communicating the indication is an ISOBUS or CANBUS connection.

As indicated above, the agricultural implement suitably comprises a rake. Alternatively, the agricultural implement may comprise a tedder or a mower.

A second aspect of the invention provides a method of operating an agricultural implement according to the first aspect of the invention, the method comprising:
- detecting when the agricultural implement commences the headland manoeuvre; and
- in response, raising at least one of the arms and moving the working implement carried thereby along the arm away from the main chassis member.

As mentioned above, by moving the innermost operating implements outwardly as the arm is pivoted upwards, a desired ground clearance (for example between the tines of a rake and the ground) is achieved quicker than by pivoting the arms alone. Additionally, a reduced extent of lifting of the arms is required to clear a typical accumulated windrow height, such that a higher ground clearance is achieve at the same lifting position of the arms meaning that a return to the working position at the end of the headland manoeuvre may be accomplished more quickly than previously.

Preferably, on completion of the said headland manoeuvre, the method of operation includes returning the said at least one of the arms and the working implement carried thereby to the positions occupied relative to the main chassis member at the commencement of said headland manoeuvre.

Preferably, the method of operation further comprises, on detection of the commencement of the headland manoeuvre, raising each (all) of the arms and displacing each working implement laterally away from the main chassis member.

Preferably the method further comprises, on detection of the commencement of the said headland manoeuvre, displacing each working implement laterally away from the main chassis member to a predetermined position.

Preferably the method of operation further comprises determining a height of material previously processed by the agricultural implement, and automatically adjusting the displacement of each working implement laterally away from the main chassis member based upon the determined height of previously processed material.

BRIEF DESCRIPTION OF THE DRAWINGS

The invention will now be described, by way of example only, with reference to the accompanying drawings in which.

DETAILED DESCRIPTION OF SPECIFIC EMBODIMENTS OF THE INVENTION

Figure 1:
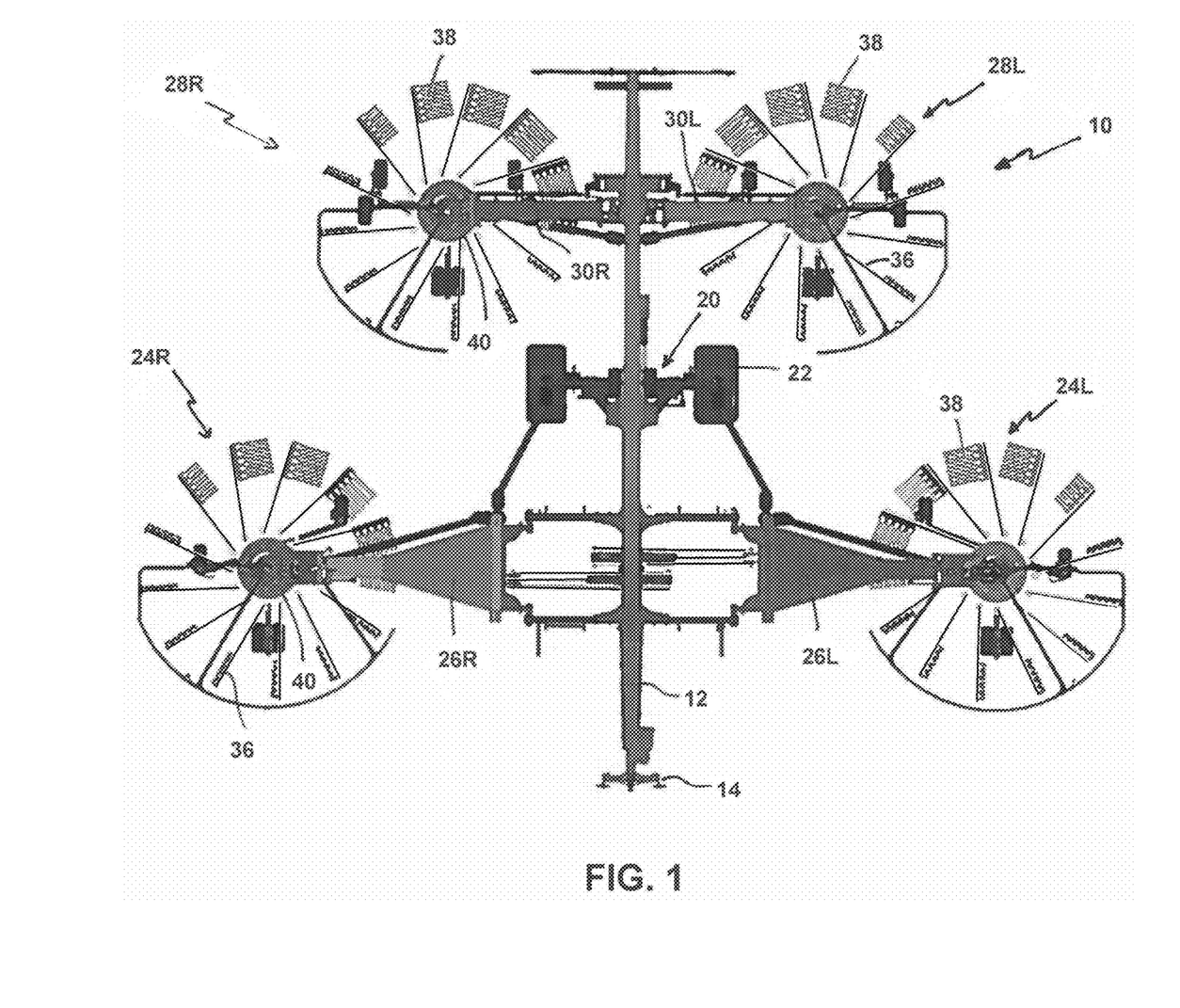
FIG. 1 is a plan view of a four rotor rake with the rakes in a working position.

FIG. 1 is a view from above of an agricultural rake, although it must be appreciated that the invention may be applicable to other agricultural implements, such as tedders or mowers.

Figure 2:
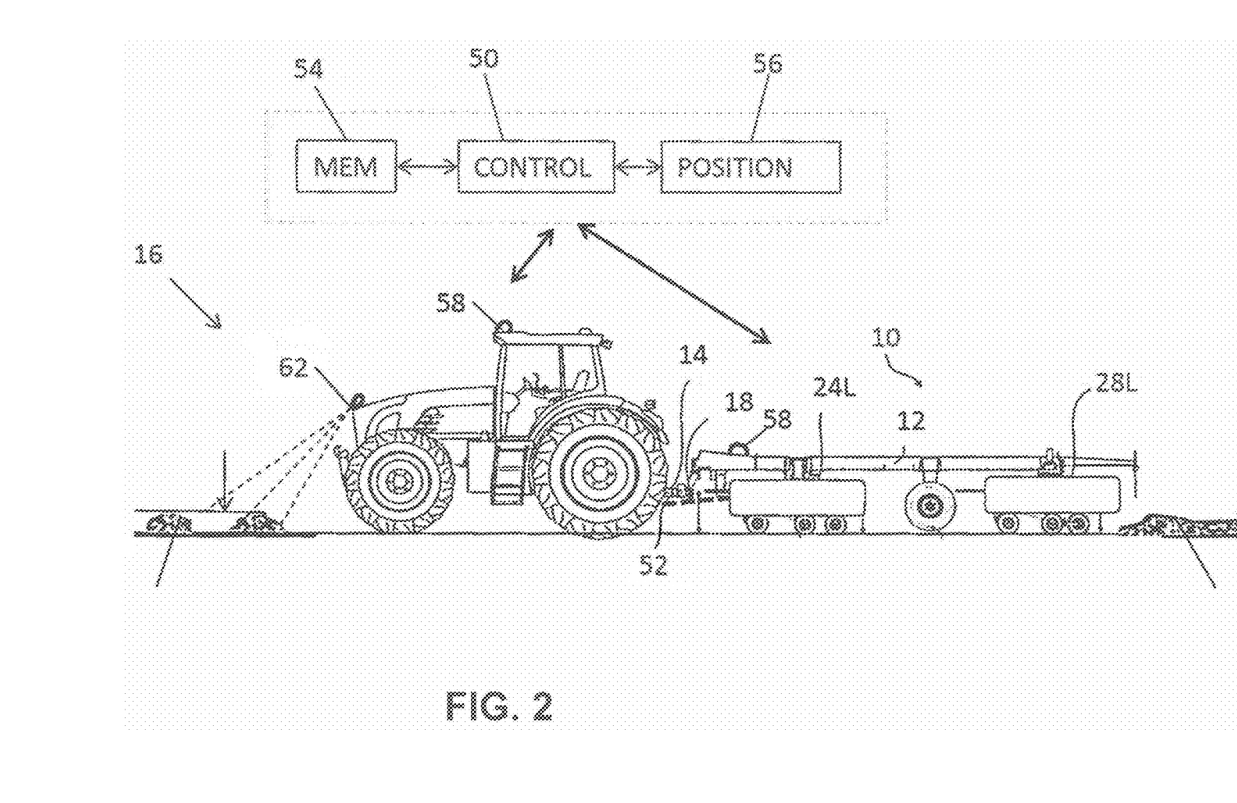
FIG. 2 schematically represents an towing vehicle towing an agricultural implement such as the rake of FIG. 1.

With reference to FIGS. 1 and 2, a plan view of an agricultural implement in a working position is shown. The agricultural implement takes the form of a four rotor rake 10 comprising a main elongate chassis member 12 running from front to rear. At the front end of the main chassis member 12 a mounting linkage 14 is provided for hitching the rake 10 to the lower links of a three point linkage 18. Towards the centre of the rake, an axle 20 with wheels 22 is pivotally attached to the main chassis member 12.

The rotation of the four rotors may be mechanically driven from a power take-off (PTO) shaft of a towing vehicle, such as a tractor 16, or electrically driven by a single electric motor and gearing arrangement on the rake, or by individual electric motors (powered from the tractor) for each rotor.

The rake 10 comprises two forward rotors 24L, 24R supported on two respective arms 26L, 26R which are pivotably attached to opposing sides of the main chassis member 12. The rotors 24L, 24R are each located a first lateral distance away from main chassis member 12. The rake 10 further comprises two rear rotors 28L, 28R supported on two respective arms 30L, 30R which are pivotably attached to opposing sides of the main chassis member 12. The rotors 28L, 28R are each located a second lateral distance away from main chassis member 12. It can be seen that the forward rotors 24L, 24R are located laterally further from the main chassis member 12 than the rear pair of rotors 28L, 28R. Arms 26L, 26R, 30L, 30R can be raised and lowered about respective pivot points by any suitable drive means, for example hydraulic cylinders coupled between the arms and the main chassis member. Conveniently the drive means are adapted to be operated concurrently allowing simultaneous operation of the arms 26L, 26R, 30L, 30R.

In FIG. 1 the arms 26L, 26R, 30L, 30R are in a lowered working position ready to rake a crop, such as grass. When the rake 10 is not in use, the arms 26L, 26R, 30L, 30R are raised upwards into a substantially vertical transport position which reduces the overall width of the agricultural implement and in particular facilitates transport along public roads. The arms 26L, 26R, 30L, 30R may be pivoted into a position, a headland position, as will be described further below between the working position and the transport position.

The rotors each comprise a hub 40 mounted to the underside of a gearbox for rotation around a vertical axis. Tine arms 36 are mounted to, and extend radially from, the hub. Crop engaging tines 38 are attached to the outermost ends of each tine arm 36.

For each rotor 24L, 24R, 28L, 28R a rotor running gear includes one or more connected beams 44 carrying ground engaging support wheels 42 mounted to the underside of the rotor to provide support when travelling across the field during operation. Between each hub 40 and the respective support wheels 42, an electrically or hydraulically actuated mechanism is arranged to extend the running gear away from the hub, thereby raising the effective operating height of the rotor relative to the ground, and to retract the running gear towards the hub, lowering the rotor.

Figure 3:
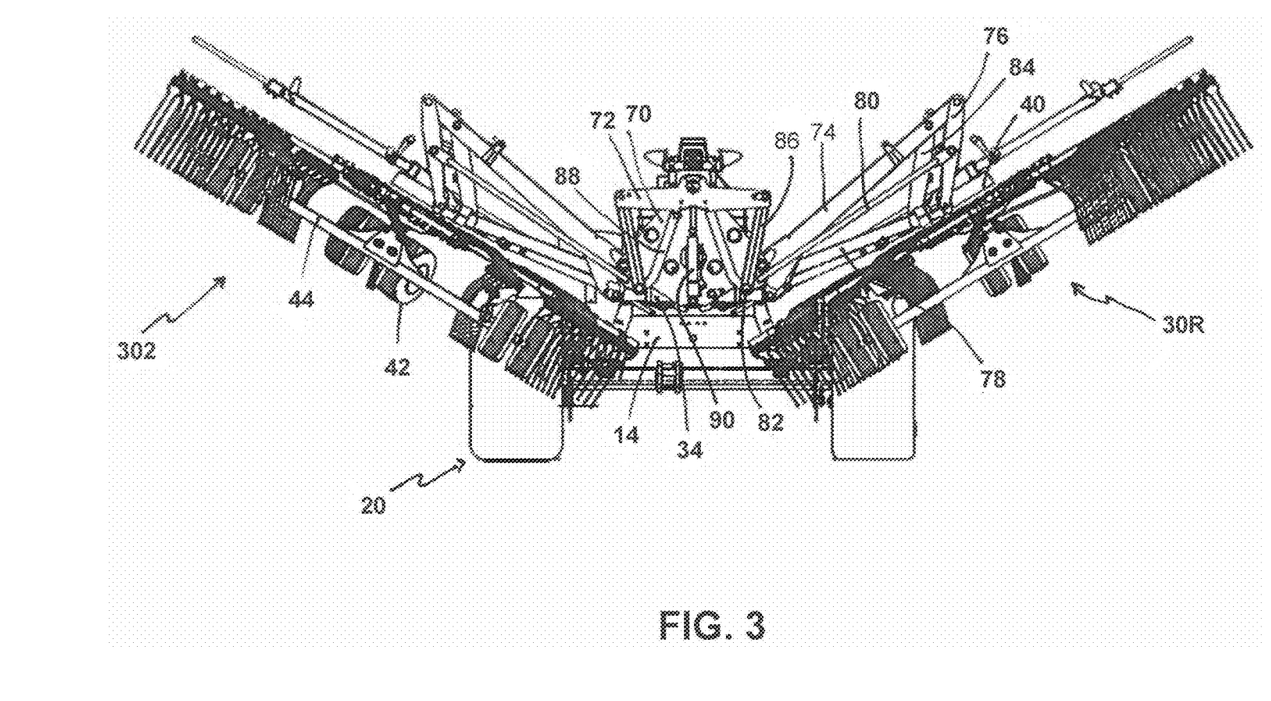
FIG. 3 is a head-on view of the rake of FIG. 1 showing the trailing rakes and the arms raised in a known headland position.
Figure 4:
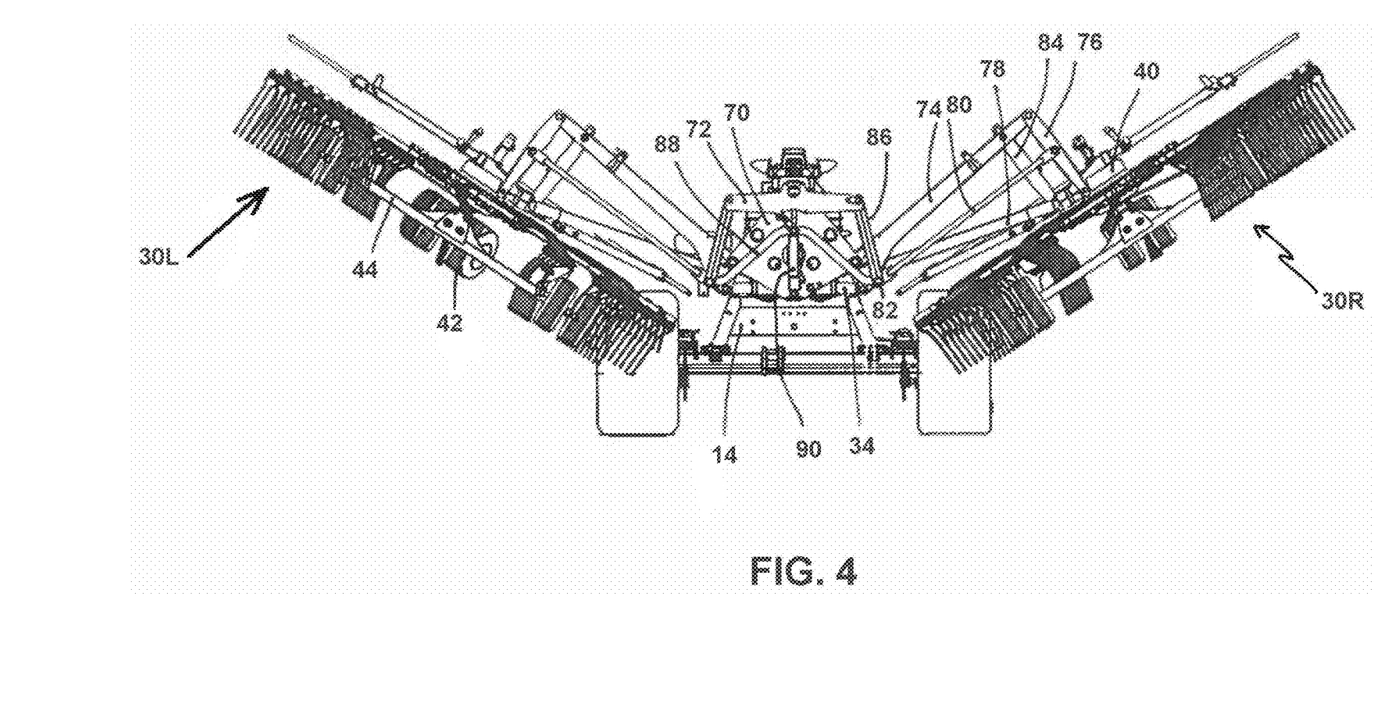
FIG. 4 is the view of FIG. 3 showing the attached rotors moved outwards into a headland position in accordance with the present invention.
Figure 5:
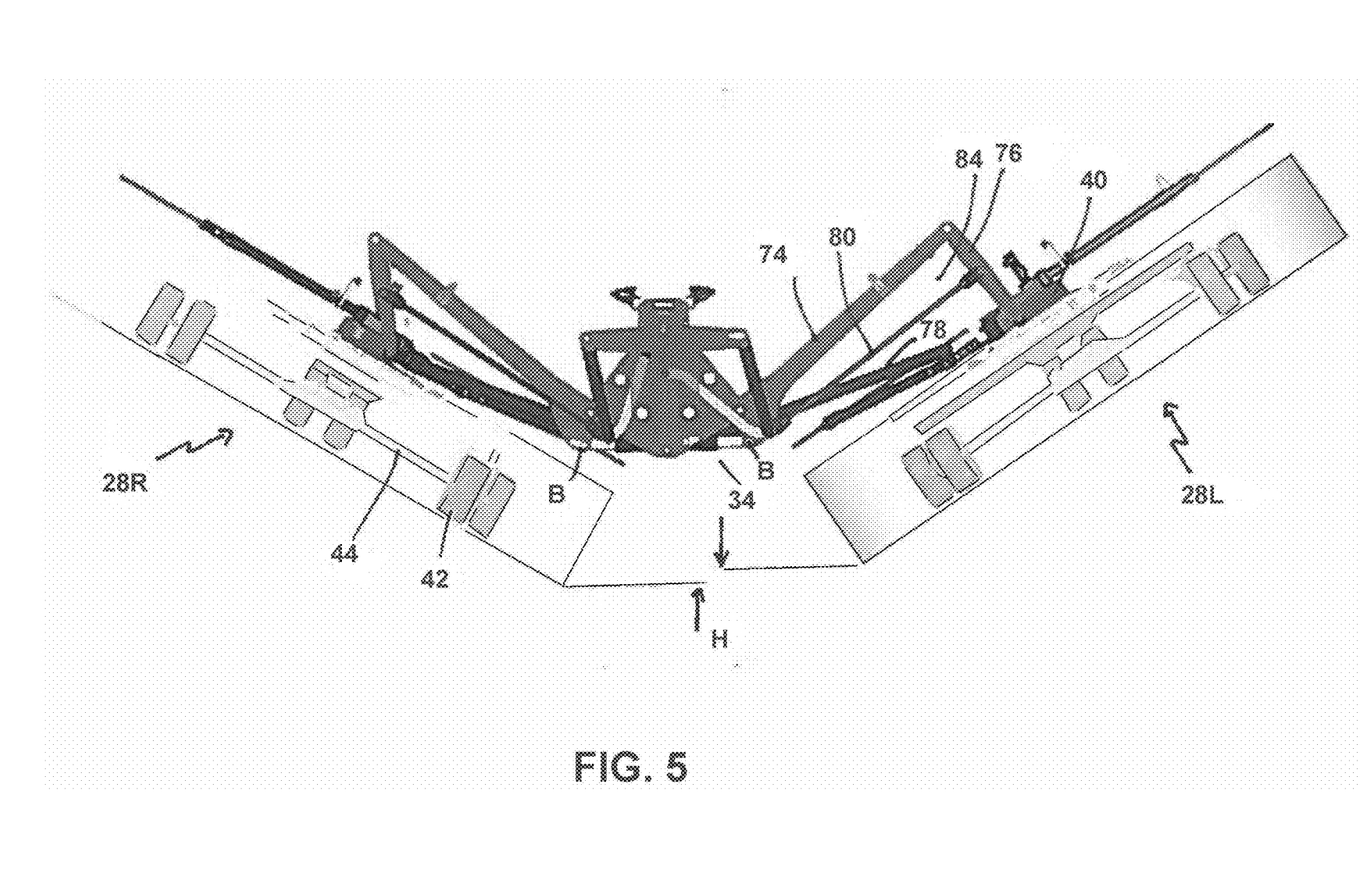
FIG. 5 is a comparison view between FIGS. 3 and 4 showing the increase in ground clearance.

Turning to the rear rotors, as may best be seen in FIGS. 3, 4 and 5, each hub 40 is connected to the main chassis member 12 by a linkage arrangement incorporating the arms 30L, 30R operable to move each rotor 28L, 28R with respect the main chassis member 12.

FIGS. 3, 4 and 5 show a head-on view of the rake of FIG. 1 with the two forward rotors omitted for clarity and the arms 30L, 30R partially raised, as may be conventionally selected when entering a headland turn, that is, the arms 30L, 30R are in a headland position.

As can be seen in the region of the rear rotors the main chassis member is provided with a secondary chassis member 70 and a crossbeam 72, each securely mounted in a suitable manner to the main chassis member 12. In a preferred embodiment, the secondary chassis member 70 and the crossbeam 72 are formed as part of a single welded group. Each side of the agricultural implement corresponds to the other so only one side is described below.

Each arm comprises a major portion 74 hingedly connected at a first end to a lower side of the secondary chassis member 70 by a first pivot (A). A second end of the major portion 74 is hingedly attached to a first end of a depending portion 76 of the arm. A second end of the depending portion 76 supports the hub 40 at a connection with the hub 40. A drive shaft 78 extends between the main chassis member 12 and the hub 40. A connecting rod 80 is pivotally connected to a central part of the depending portion 76 of the arm to a connecting pivot pin arrangement 82. A second connecting rod 84 is connected at a first end towards the second end of the major portion 74 and pivotally connected at a second end to the hub 40. It can be seen that the second connecting rod 84 extends substantially parallel to the depending portion 76. Conveniently the upper end of the second connecting rod is provided with a elongate opening. A pin extending longitudinally across the major portion 74 extends through the elongate opening.

A third connecting rod 86 depends from a free end of the crossbeam 72 to the first connecting pivot point 82. A coupling rod 88, of substantially elongate S-shape is connected at a first lower end to the connecting pivot pin arrangement 82. A second upper end is connected to an upper end of a suitable drive means, for example a carriage driven by a hydraulic cylinder 90. The hydraulic cylinder is conveniently secured at a lower end to a mounting point provided on the secondary chassis member 70. A drive means in the form of a double ended hydraulic cylinder 34 is shown connected at a lower region of the main chassis member 12. Free ends of the hydraulic cylinder 34 are secured to a second pivot point (B) (cf FIG. 5) provided on the first end of the major portion 74. In relation to the first end of the major portion, the second pivot point is vertically displaced below the first pivot point.

In order to lift the arm, the hydraulic cylinder 34 is extended causing the major portion 74 of the arm to rotate about the first pivot point. The arm may be lowered by retracting the hydraulic cylinder 34.

In order to improve ground clearance when the arms are in the headland position, in accordance with the present invention, the hydraulic cylinder 90 is actuated to pull down the upper ends of the connecting rod 88. This causes the lower ends of the connecting rods 88 to be driven outwards, such that the connecting rod 80 causes the depending portion 76 to pivot with respect to the major portion 74. The hub 40 is thus displaced outwards with respect to the main chassis member 12. The pantograph formed between the hub 40, the major portion 74, the connecting rod 80 and the depending portion 76 maintains the relationship between the hub 40 and the major portion 74 of the arm. It can be seen that by controlling operation of the hydraulic cylinder 90, the distance that the hub 40 (and the associated rotor) is displaced with respect to the main chassis member 12 may also be controlled.

It can be seen that a four bar planar linkage is formed that transfers the movement of the pivot pin arrangement 82 into lateral displacement of the hub with respect to the major portion.

FIG. 5 contrasts the left hand side of FIG. 3 and the right hand side of FIG. 4 illustrating the increased ground clearance H resulting from this operation, which reduces the likelihood of the deployed tines 38 disturbing an already-processed windrow W.

In a further embodiment (not shown) the apparatus may be constructed so that this outward movement during raising may be applied to only a single side of the agricultural implement.

Reverting to FIG. 2, the agricultural implement (rake) is provided with a programmable control system 50 configured to effect this outward movement by controlled operation of the drive mechanisms. This control system 50 may be physically mounted on the agricultural implement 10 and in communication with the control systems of the tractor 16 via a data connection such as an ISOBUS or CANBUS link 52, or it may form part of the control system for the towing vehicle.

The control system 50 is coupled with a storage device 54 holding software controlling operation of the system together with data such as preferred user settings for the extent of lateral offset to be applied to the rotors in a headland turn manoeuvre. The control system 50 is suitably also coupled to a position-determining system 56 which receives satellite positioning data (e.g. GPS, GNSS or others) from at least one receiver 58 mounted on either the tractor 16 or the agricultural implement 10. By reference to stored field map data (held in memory 54) and the determined current location (from system 56), the control system 50 may automatically identify the starting point of a headland manoeuvre such as a headland turn and perform the actions of both raising the arms and moving the rotors outwardly from the main chassis member. Alternately, the start of the headland manoeuvre may be specifically indicated to the control system 50 by an operator, such as by a driver of the tractor 16 operating a control within the tractor cab to trigger the raising of the arms and outward movement of one or more of the rotors.

As will be understood, the control system is preferably further configured to detect when the agricultural implement completes the said headland manoeuvre and, response, return the said at least one of the arms and the rotor carried thereby to the positions occupied relative to the main chassis member at the commencement of said headland manoeuvre. As above, this may be based on a determined position for the vehicle and agricultural implement, or may alternately be triggered by a direct command of an operator.

Suitably, the control system is operable to raise one or all of the arms to a first height for road transport of the agricultural implement and a second (lower) height when performing manoeuvres such as a headland turn. It will be understood that when moving to the transport position, the control system will also ensure that the PTO is turned off (or otherwise disconnected) such that the rotors are no longer being driven and that the vehicle speed is less than a predetermined threshold value.

Whilst the automated movement of one or more of the rotors outwardly at the start of a predetermined movement may shift the (each) rotor to a predetermined position along its respective arm, optimally, the control system may determine a height WH for the deposited windrow W via one or more sensors 62 carried by the tractor 16 or agricultural implement 10 and adapt the degree of offset based on the windrow height W. An example of a system for determining windrow profiles, based on radar and/or LIDAR technology carried by a vehicle is described in European patent application EP-A-3342284.

Figure 6:
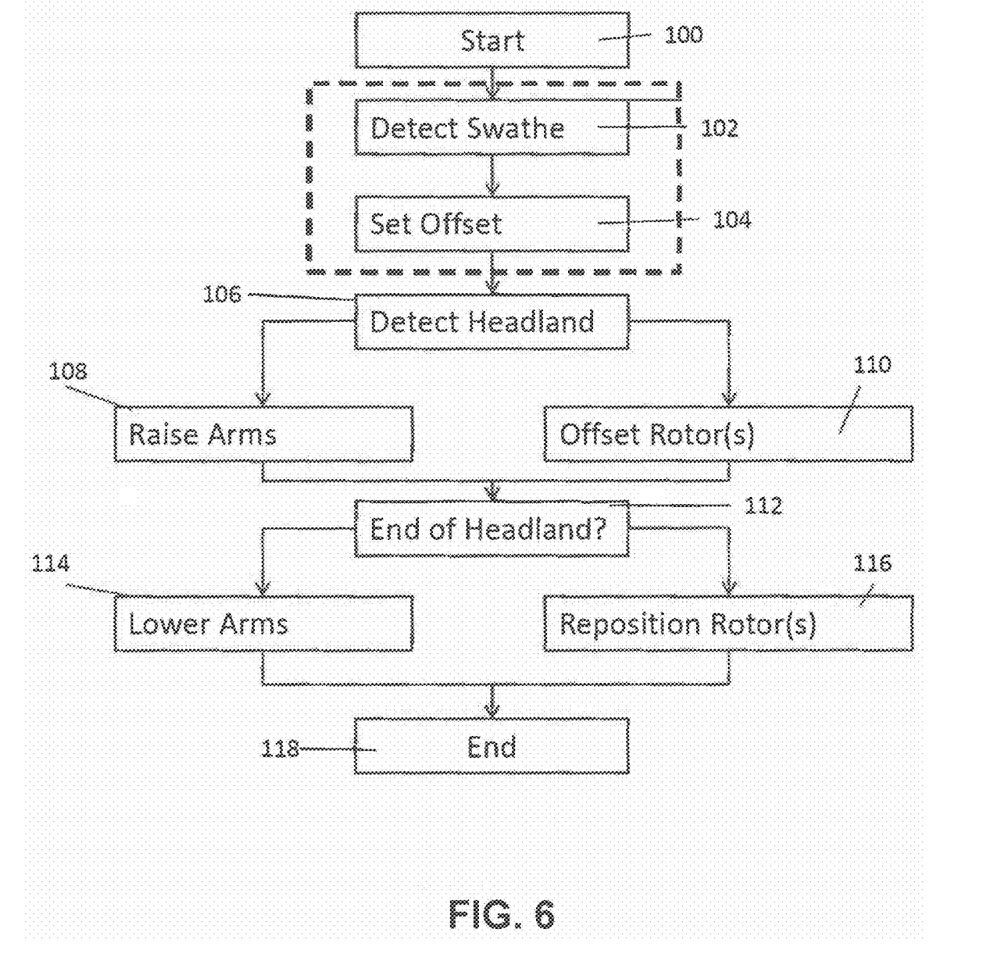
FIG. 6 is a flow chart representing a method of operating an agricultural implement such as the rake of FIG. 1.

FIG. 6 is a flowchart representation of a method of operating an agricultural implement, such as the rake of FIG. 1, in accordance with the present invention.

The method commences at step 100, and is followed by a pair of optional steps 102, 104. At step 102, the height of the previously deposited windrow is determined, as described above with reference to FIG. 2 and sensor 62, following which an appropriate degree of offset for the or each rotor to be raised is determined at step 104. As will be understood, steps 102 and 104 may be omitted for a previously specified default offset position, for example a factory or operator specified preset offset position, for the or each rotor.

At step 106, the start of a headland manoeuvre to be performed (e.g. a headland turn) by the agricultural implement is detected by the control system (either in response to a sensor signal or to an operator command). This is followed by a pair of processes conveniently performed in parallel. At step 108, the or each arm carrying a rotor to be raised is elevated to a predetermined angle (which may or may not be dependent on detected swathe height) which angle is less than that assumed when the agricultural implement is in fully-closed road transport mode, that is the headland position. The second of the parallel processes at step 110 is the outward movement of the or each selected rotor from the main chassis member as the arm is raised. Whilst steps 108 and 110 are ideally performed simultaneously to minimize delay, it will be understood that the movement of step 110 may be slightly delayed to ensure that the crop-engaging tines of the rotor have disengaged from a current windrow before lateral motion is applied. The control system may also control the speed at which the rotor is moved to the offset position.

On determination of the completion of the headland manoeuvre at step 112, the processes are reversed, with step 114 returning the or each raised arm, and step 116 returning the or each displaced rotor, to the positions each occupied relative to the main chassis member at the commencement of the manoeuvre. The process ends at step 118.

In the foregoing, the applicants have described an agricultural implement comprising an elongated main chassis member, ground engaging wheels for supporting the main chassis member on the ground and at least two rotors each carried by a respective arm. The arms are pivotably connected to the main chassis member and provided with a first movement mechanism operable to raise and lower the distal ends of the arms into a working position in which the respective rotors are carried on opposing sides of the main chassis member at a distance away from the main chassis member. A second movement mechanism is operable to move a rotor along its respective arm towards or away from the main chassis member to adjust swathe width and/or working width. A control system detects when the agricultural implement commences a headland manoeuvre such as a headland turn and, in response, raises at least one of the arms and moves the rotor carried thereby away from the main chassis member to increase ground clearance and thereby avoid disturbance to existing windrows.

From reading the present disclosure, other modifications will be apparent to persons skilled in the art. Such modifications may involve other features which are already known in the field of towed agricultural implements and component parts therefore and which may be used instead of or in addition to features already described herein.

The invention claimed is:

1. An agricultural implement comprising:
an elongated main chassis member, a secondary chassis member, a cross beam and a hydraulic cylinder operating between a mounting point provided on the secondary chassis member and a drive;
ground engaging wheels for supporting the main chassis member on the ground; and
front and rear sets of arms carried from the elongated main chassis member, each set comprising an arm to each side of the main chassis member, each arm comprising at least one working implement including a hub and each arm pivotally connected to the main chassis member and adapted to move between a working position, a headland position and a transport position, the arms to each side of the elongated main chassis member forming a pair having a rear working implement and a forward working implement, each of the rear arms further comprising a major portion and a depending portion, a first connecting rod, a second connecting rod, a third connecting rod and a fourth connecting rod, wherein:
the major portion is hingedly connected at a first end to a lower side of the secondary chassis member at a first pivot point and a second end of the major portion is hingedly connected to a first end of the depending portion;
a second end of the depending portion is hingedly connected to the hub of the rear working implement;
the first connecting rod is pivotally connected at a first end to a central part of the depending portion and connected at a second end to a connecting pivot pin arrangement;
the second connecting rod is connected at a first end towards the second end of the major portion and pivotally connected at a second end to the hub;
the third connecting rod is connected between a free end of the cross beam and the connecting pivot point arrangement, the fourth connecting rod is connected at a lower first end to the connecting pivot pin arrangement and at a upper second end to the drive driven by the hydraulic cylinder;

the forward working implement being located laterally further from the elongated main chassis member in the working position than the rear working implement, and when moving from the working position to the headland position the hydraulic cylinder is operated to pull down the first end of the fourth connecting rod to displace the lower end of the fourth connecting rod outwards, causing the first connecting rod to cause the depending portion to pivot with respect to the main chassis member so as to displace the rear working implement along its arm, such that when in the headland position the rear working implement of at least one of the pairs of arms is displaced laterally away from the main chassis member.

2. The agricultural implement according to claim 1, wherein each of the at least one working implements comprises a rotor.

3. The agricultural implement according to claim 1, further comprising:
a control system configured to detect when the headland position is required and, in response, commences a headland manoeuvre comprising:
operating the hydraulic cylinder to displace the rear working implement of each arm laterally away from the main chassis member and raising each arm to the headland position.

4. The agricultural implement according to claim 3, wherein the control system is further configured to detect when the headland position is no longer required and, in response, returns each arm to the working position.

5. The agricultural implement according to claim 3, wherein the control system is configured, on commencement of the headland manoeuvre, to move each rear working implement to a predetermined lateral position away from the main chassis member.

6. The agricultural implement according to claim 5, wherein the predetermined lateral position is adjustable by a user.

7. The agricultural implement according to claim 3, wherein the agricultural implement further comprises a position determination system coupled with the control system, by which the control system identifies the commencement of the headland manoeuvre.

8. The agricultural implement according to claim 1, wherein the agricultural implement comprises a rake or a tedder.

9. The agricultural implement according to claim 3, further comprising a towing vehicle wherein the agricultural implement and the towing vehicle further comprise one or more sensors coupled with the control system to determine a swathe height of material deposited by the agricultural implement, and the control system is further configured to adjust the extent of movement of the rear working implement along each arm away from the main chassis member during the headland manoeuvre, based on the swathe height.

10. The agricultural implement according to claim 3, further comprising a towing vehicle, wherein the control system receives an indication of the commencement of the headland manoeuvre from the towing vehicle.

11. The agricultural implement according to claim 10, wherein the indication is communicated by an ISOBUS or CANBUS connection.

12. A method of operating an agricultural implement according to claim 1, comprising:
detecting when the agricultural implement commences a headland manoeuvre; and
in response, raising at least one of the arms having a rear working implement and moving the working implement carried thereby along the arm away from the main chassis member.

13. The method according to claim 12, wherein on completion of the headland manoeuvre, returning the at least one of the arms and the working implement carried thereby to the positions occupied relative to the main chassis member at the commencement of the headland manoeuvre.

14. The method according to claim 12, further comprising, on detection of the commencement of the headland manoeuvre, raising each of the arms having a rear working implement and displacing each rear working implement laterally away from the main chassis member.

15. The method according to claim 12, further comprising, on detection of the commencement of the headland manoeuvre, displacing each rear working implement laterally away from the main chassis member to a predetermined position.

16. The method according to claim 12, further comprising determining a height of material previously processed by the agricultural implement, and automatically adjusting the displacement of each rear working implement laterally away from the main chassis member based upon the determined height of the previously processed material.

* * * * *